(12) United States Patent
Zhang et al.

(10) Patent No.: US 8,874,410 B2
(45) Date of Patent: Oct. 28, 2014

(54) SYSTEMS AND METHODS FOR PATTERN DETECTION

(75) Inventors: Xun Zhang, Westford, MA (US); Mark D. Thornley, Fort Collins, CA (US); Viswanath Annampedu, Schnecksville, PA (US); Peter J. Windler, Fort Collins, CO (US)

(73) Assignee: LSI Corporation, San Jose, CA (US)

( * ) Notice: Subject to any disclaimer, the term of this patent is extended or adjusted under 35 U.S.C. 154(b) by 676 days.

(21) Appl. No.: 13/113,210

(22) Filed: May 23, 2011

(65) Prior Publication Data

US 2012/0303327 A1 Nov. 29, 2012

(51) Int. Cl.
 H03F 1/26 (2006.01)
 H04B 15/00 (2006.01)
 G11B 5/09 (2006.01)
 G11B 20/10 (2006.01)
 H04L 7/04 (2006.01)
 H04L 7/033 (2006.01)

(52) U.S. Cl.
 CPC .............. *H04L 7/0334* (2013.01); *H04L 7/046* (2013.01); *G11B 20/10222* (2013.01); *H04L 2007/047* (2013.01)
 USPC .......................................... 702/189; 360/39

(58) Field of Classification Search
 CPC ........... H04L 7/0334; G11B 20/10009; G11B 20/00; A47L 15/00
 USPC .......................................... 702/189; 360/39
 See application file for complete search history.

(56) References Cited

U.S. PATENT DOCUMENTS

| 3,973,182 | A | 8/1976 | Kataoka |
|---|---|---|---|
| 3,973,183 | A | 8/1976 | Kataoka |
| 4,024,571 | A | 5/1977 | Dischert et al. |
| 4,777,544 | A | 10/1988 | Brown et al. |
| 5,130,866 | A | 7/1992 | Klaassen et al. |
| 5,237,325 | A | 8/1993 | Klein et al. |
| 5,278,703 | A | 1/1994 | Rub et al. |

(Continued)

FOREIGN PATENT DOCUMENTS

| FR | 2904168 A1 | 1/2008 |
|---|---|---|
| WO | WO 03/047091 | 6/2003 |
| WO | WO 2008/009620 | 1/2008 |

OTHER PUBLICATIONS

U.S. Appl. No. 12/663,319, filed Dec. 7, 2009, Ratnakar Aravind.

(Continued)

*Primary Examiner* — John Breene
*Assistant Examiner* — Manuel Rivera Vargas
(74) *Attorney, Agent, or Firm* — Hamilton DeSanctis & Cha

(57) ABSTRACT

Various embodiments of the present invention provide systems and methods related to pattern detection. As an example, a system for sample selection is disclosed that includes a difference calculation circuit, a comparator circuit, and an output selector circuit. The difference calculation circuit is operable to calculate a first difference between a first value corresponding to a first digital sample and a second value corresponding to a second digital sample, and to calculate a second difference between a third value corresponding to a third digital sample and a fourth value corresponding to a fourth digital sample. The comparator circuit is operable to compare the first difference with the second difference to yield a comparison output. The output selector circuit is operable to select one of the second value and the fourth value as an output based at least upon the comparison output.

19 Claims, 4 Drawing Sheets

(56) References Cited

U.S. PATENT DOCUMENTS

| | | | |
|---|---|---|---|
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,594,341 A | 1/1997 | Majidi-Ahy |
| 5,668,679 A | 9/1997 | Swearingen et al. |
| 5,696,639 A | 12/1997 | Spurbeck et al. |
| 5,781,129 A | 7/1998 | Schwartz et al. |
| 5,787,125 A | 7/1998 | Mittle |
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,892,632 A | 4/1999 | Behrens |
| 5,955,783 A | 9/1999 | Ben-Efraim |
| 5,970,104 A | 10/1999 | Zhong et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,069,583 A | 5/2000 | Silverstrin et al. |
| 6,081,397 A | 6/2000 | Belser |
| 6,111,712 A | 8/2000 | Vishakhadatta et al. |
| 6,208,478 B1 | 3/2001 | Chiu et al. |
| 6,269,058 B1 | 7/2001 | Yamanoi et al. |
| 6,278,591 B1 | 8/2001 | Chang |
| 6,400,518 B1 | 6/2002 | Bhaumik et al. |
| 6,404,829 B1 | 6/2002 | Sonu |
| 6,411,452 B1 | 6/2002 | Cloke |
| 6,441,661 B1 | 8/2002 | Aoki et al. |
| 6,490,110 B2 * | 12/2002 | Reed et al. ............... 360/48 |
| 6,493,162 B1 | 12/2002 | Fredrickson |
| 6,519,102 B1 | 2/2003 | Smith |
| 6,530,060 B1 | 3/2003 | Vis et al. |
| 6,603,622 B1 | 8/2003 | Christiansen et al. |
| 6,606,048 B1 | 8/2003 | Sutardja |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,876,511 B2 | 4/2005 | Koyanagi |
| 6,912,099 B2 | 6/2005 | Annampedu et al. |
| 6,963,521 B2 | 11/2005 | Hayashi |
| 6,999,257 B2 | 2/2006 | Takeo |
| 6,999,264 B2 | 2/2006 | Ehrlich |
| 7,002,761 B1 | 2/2006 | Sutardja et al. |
| 7,002,767 B2 | 2/2006 | Annampedu et al. |
| 7,038,875 B2 | 5/2006 | Lou et al. |
| 7,054,088 B2 | 5/2006 | Yamazaki et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,136,250 B1 | 11/2006 | Wu et al. |
| 7,154,689 B1 | 12/2006 | Shepherd et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,206,146 B2 | 4/2007 | Flynn et al. |
| 7,230,789 B1 | 6/2007 | Brunnett et al. |
| 7,248,425 B2 | 7/2007 | Byun et al. |
| 7,253,984 B1 | 8/2007 | Patapoutian et al. |
| 7,265,937 B1 | 9/2007 | Erden et al. |
| 7,286,313 B2 | 10/2007 | Erden et al. |
| 7,301,717 B1 | 11/2007 | Lee et al. |
| 7,308,057 B1 | 12/2007 | Patapoutian |
| 7,323,916 B1 | 1/2008 | Sidiropoulos et al. |
| 7,362,536 B1 | 4/2008 | Liu et al. |
| 7,375,918 B1 | 5/2008 | Shepherd et al. |
| 7,411,531 B2 | 8/2008 | Aziz et al. |
| 7,420,498 B2 | 9/2008 | Barrenscheen |
| 7,423,827 B2 | 9/2008 | Neville et al. |
| 7,446,690 B2 | 11/2008 | Kao |
| 7,499,238 B2 | 3/2009 | Annampedu |
| 7,525,460 B1 | 4/2009 | Liu et al. |
| 7,529,320 B2 | 5/2009 | Byrne et al. |
| 7,558,177 B2 | 7/2009 | Ogura et al. |
| 7,602,568 B1 | 10/2009 | Katchmart |
| 7,616,395 B2 | 11/2009 | Yamamoto |
| 7,620,101 B1 | 11/2009 | Jenkins |
| 7,630,155 B2 | 12/2009 | Maruyama et al. |
| 2002/0001151 A1 | 1/2002 | Lake |
| 2002/0150179 A1 | 10/2002 | Leis et al. |
| 2002/0176185 A1 | 11/2002 | Fayeulle et al. |
| 2002/0181377 A1 | 12/2002 | Nagata et al. |
| 2003/0090971 A1 | 5/2003 | Gushima et al. |
| 2003/0095350 A1 | 5/2003 | Annampedu et al. |
| 2004/0179460 A1 | 9/2004 | Furumiya et al. |
| 2005/0046982 A1 | 3/2005 | Liu et al. |
| 2005/0157415 A1 | 7/2005 | Chiang |
| 2005/0243455 A1 | 11/2005 | Annampedu |
| 2006/0087757 A1 * | 4/2006 | Flynn et al. ............... 360/39 |
| 2007/0064847 A1 | 3/2007 | Gaedke |
| 2007/0071152 A1 | 3/2007 | Chen et al. |
| 2007/0103805 A1 | 5/2007 | Hayashi |
| 2007/0104300 A1 | 5/2007 | Esumi et al. |
| 2007/0183073 A1 | 8/2007 | Sutardja et al. |
| 2007/0230015 A1 | 10/2007 | Yamashita |
| 2007/0263311 A1 | 11/2007 | Smith |
| 2007/0280059 A1 | 12/2007 | Cheng et al. |
| 2008/0056403 A1 | 3/2008 | Wilson |
| 2008/0080082 A1 | 4/2008 | Erden et al. |
| 2008/0212715 A1 | 9/2008 | Chang |
| 2008/0266693 A1 | 10/2008 | Bliss et al. |
| 2009/0002862 A1 | 1/2009 | Park |
| 2009/0142620 A1 | 6/2009 | Yamamoto et al. |
| 2009/0245448 A1 | 10/2009 | Ran et al. |
| 2009/0274247 A1 | 11/2009 | Galbraith et al. |

OTHER PUBLICATIONS

U.S. Appl. No. 12/838,601, filed Aug. 19, 2010, Wilson, Ross.
U.S. Appl. No. 12/851,475, filed Aug. 5, 2010, Annampedu, Viswanath.
U.S. Appl. No. 12/887,327, filed Sep. 21, 2010, Llu et al.
U.S. Appl. No. 12/894,221, filed Sep. 30, 2010, Yang et al.
U.S. Appl. No. 12/946,048, filed Nov. 15, 2010, Yang et al.
U.S. Appl. No. 12/947,962, filed Nov. 17, 2010, Liu et al.
U.S. Appl. No. 12/946,033, filed Nov. 15, 2010, Yang et al.
U.S. Appl. No. 12/955,789, filed Nov. 29, 2010, Annampedu et al.
U.S. Appl. No. 12/955,821, filed Nov. 29, 2010, Annampedu et al.
U.S. Appl. No. 12/972,904, filed Dec. 20, 2010, Viswanath Annampedu.
U.S. Appl. No. 13/100,021, filed May 3, 2011, Xia, Haitao et al.
U.S. Appl. No. 13/113,210, filed May 23, 2011, Zhang, Xun et al.
U.S. Appl. No. 13/014,754, filed Jan. 27, 2011, Viswanath Annampedu.
U.S. Appl. No. 13/009,067, filed Jan. 19, 2011, Zhang, Xun et al.
U.S. Appl. No. 13/050,048, filed Mar. 17, 2011, Xia, Haitao et al.
U.S. Appl. No. 13/096,873, filed Apr. 28, 2011, Wilson, Ross S.
U.S. Appl. No. 13/173,088, filed Jun. 30, 2011, Grundvig et al.
U.S. Appl. No. 13/186,267, filed Jul. 19, 2011, Xia, Haitao et al.
U.S. Appl. No. 13/242,983, filed Sep. 23, 2011, Grundvig, Jeffery P.
Annampedu, V. et al, "Adaptive Algorithms for Asynchronous Detection of Coded Servo Signals Based on Interpolation", IEEE Transactions on Magnetics, vol. 41, No. 10, Oct. 2005.
Aziz and Annampedu, "Asynchronous Maximum Likelihood (ML) Detection of Servo repeatable Run Out (RRO) Data" Magnetics Conf. IEEE International May 2006.

(56) References Cited

OTHER PUBLICATIONS

Aziz et al "Interpolation Based Maximum-Likelihood(ML) Detection of Asynchronous Servo Repeatable Run Out (RRO) Data", Digest, IEEE Intl Magnetics Conf. vol. 42, No. 10 Oct. 2006.

Kryder, M. et al "Heat Assisted Magnetic Recording" Proc. IEEE, vol. 96, No. 11, p. 1810, Nov. 2008.

Weller et al "Thermal Limits in Ultrahigh-density Magnetic Recording" IEEE Trans. Magn. vol. 35, No. 6, p. 4423, Nov. 1999.

* cited by examiner

SYSTEMS AND METHODS FOR PATTERN DETECTION

BACKGROUND OF THE INVENTION

The present inventions are related to systems and methods sensing data, and more particularly to systems and methods for pattern detection.

Storage devices and data transfer devices often rely on reference patterns that when detected indicate subsequent data to be processed. When the reference pattern cannot be found, the subsequent data can become unrecoverable. A number of processes have been developed to increase the potential of identifying the reference pattern including adding another instance of the reference pattern some distance from an initial instance of the reference pattern. Such an approach requires substantial distance between the instances of the reference patterns to avoid a single media failure from damaging both reference patterns. Even where sufficient distance is employed, such an approach requires using a greater portion of a storage device for overhead purposes. Other cases rely on simple threshold detection to determine a sync pattern. However, such an approach may be unreliable.

Hence, for at least the aforementioned reasons, there exists a need in the art for advanced systems and methods for detecting synchronization patterns.

BRIEF SUMMARY OF THE INVENTION

The present inventions are related to systems and methods sensing data, and more particularly to systems and methods for pattern detection.

Various embodiments of the present invention provide systems for sample selection. Such embodiments include a difference calculation circuit, a comparator circuit, and an output selector circuit. The difference calculation circuit is operable to calculate a first difference between a first value corresponding to a first digital sample and a second value corresponding to a second digital sample, and to calculate a second difference between a third value corresponding to a third digital sample and a fourth value corresponding to a fourth digital sample. The comparator circuit is operable to compare the first difference with the second difference to yield a comparison output. The output selector circuit is operable to select one of the second value and the fourth value as an output based at least upon the comparison output.

In some instances of the aforementioned embodiments, the system further includes an analog to digital converter circuit operable to convert an analog input to a series of digital samples. The analog input signal includes an information set exhibiting a bit period. In some such instances, the first digital sample, the second digital sample, the third digital sample, and the fourth digital sample correspond to the analog input signal during the same cycle of the bit period. In various instances of the aforementioned embodiments, the first digital sample and the third digital sample correspond to the analog input signal during a first half cycle of the bit period, and the second digital sample and the fourth digital sample correspond to the analog input signal during a second half cycle of the bit period. In some such instances, the first half cycle immediately precedes the second half cycle.

In some instances of the aforementioned embodiments, the digital samples include at least sixteen samples generated for each bit period. In such instances, the first value is the value of the first digital sample, the second value is the value of the second digital sample, the third value is the value of the third digital sample, and the fourth value is the value of the fourth digital sample. In various instances of the aforementioned embodiments, the systems further include an interpolation circuit that is operable to interpolate the digital samples to align at least one of the first digital sample, the second digital sample, the third digital sample, and the fourth digital sample to a sub-T boundary yielding the first value, the second value, the third value, and the fourth value.

In one or more instances of the aforementioned embodiments, the comparison value is a first comparison value. The difference calculation circuit is further operable to calculate a third difference between a fifth value corresponding to a fifth digital sample and a sixth value corresponding to a sixth digital sample, and to calculate a fourth difference between a seventh value corresponding to a seventh digital sample and an eighth value corresponding to an eighth digital sample. The comparator circuit is further operable to compare the first difference with the third difference to yield a second comparison output, and to compare the first difference with the fourth difference to yield a third comparison output. The output selector circuit operable to select the second value as the output based at least upon a combination of the first comparison output, the second comparison output, and the third comparison output.

Other embodiments of the present invention provide methods for detecting information in a data stream. Such methods include: receiving an analog input signal that includes an information set exhibiting a bit period; converting the analog input signal to a series of digital samples, wherein at least a first digital sample, a second digital sample, a third digital sample, and a fourth digital sample is generated for each bit period; calculating a first difference between first value derived from the first digital sample and a second value derived from the second digital sample; calculating a second difference between a third value derived from the third digital sample and a fourth value derived from the fourth digital sample; determining that the first difference is greater than the second difference; and selecting the value of the second digital sample as an output sample based at least in part on the determination that the first difference is greater than the second difference.

In some instances of the aforementioned embodiments, the bit period includes a plurality of T boundaries. In such instances, the methods may further include interpolating the digital samples to align at least one of the first digital sample, the second digital sample, the third digital sample, and the fourth digital sample to a sub-T boundary yielding the first value, the second value, the third value, and the fourth value. In various instances of the aforementioned embodiments, the digital samples include at least sixteen sampled generated for each bit period. In such instances, the first value is the value of the first digital sample, the second value is the value of the second digital sample, the third value is the value of the third digital sample, and the fourth value is the value of the fourth digital sample. In some instances, the first digital sample, the second digital sample, the third digital sample, and the fourth digital sample correspond to the analog input signal during the same cycle of the bit period. In various instances, the first digital sample and the third digital sample correspond to the analog input signal during a first half cycle of the bit period, and the second digital sample and the fourth digital sample correspond to the analog input signal during a second half cycle of the bit period. In some such instances, the first half cycle immediately precedes the second half cycle.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods sensing data, and more particularly to systems and methods for pattern detection.

Some instances of the present invention are deployed in relation to a servo data processing channel in a storage device. In such instances, the systems and methods described herein may be used to find the peak of a preamble to assist signal processing in the servo channel. Instead of looking for the sample having the maximum amplitude, various embodiments of the present invention compares each sample generated over a 4T bit period with the sample 2T away within the current preamble cycle. The sample corresponding to the maximum difference is declared as an output. In some cases, such systems and methods are applied to a repeating pattern (e.g., '1 1 0 0 1 1 0 0'), thus the readback waveform is roughly a sinusoid wave with a period of 4T. Compared to the method that finds the maximum amplitude directly, this approach is more robust to noise, drop-out and other disturbances that may cause "flat-top"s in the preamble field. As a result, fewer preamble cycles are needed for peak detection and format efficiency can be improved.

Such an approach provides an algorithm that detects peaks robustly in the presence of noise, drop-out and other disturbances that may cause wide peaks in the preamble field. In part because of the robustness, fewer preamble cycles can be used for peak detection, which results in higher format efficiency. The shorter preamble further reduces the probability that drop-out and other media defects that may cause wide peaks can happen during preamble, which offers more performance gain. Furthermore, the algorithm is simple with only a few addition and comparison operations, therefore the implementation complexity is low. Based upon the disclosure provided herein, one of ordinary skill in the art will recognize a variety of other advantages and/or uses that may be applied to the present invention.

Figure 1:
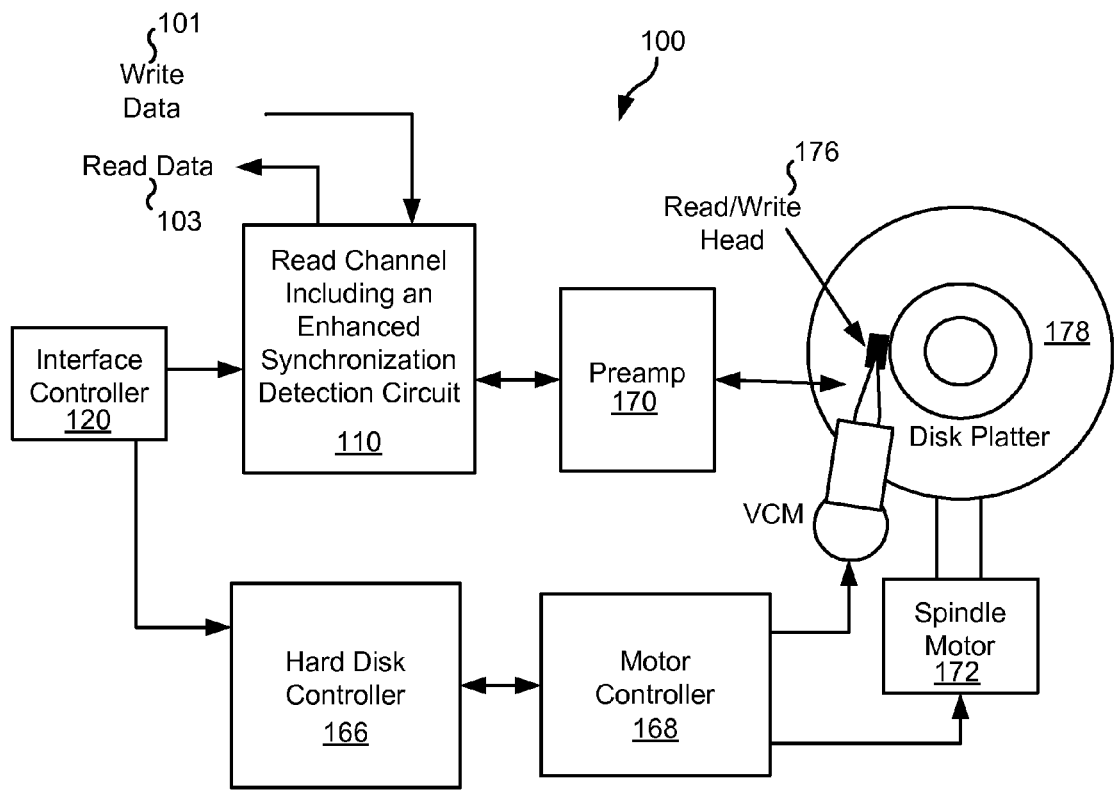
FIG. 1 depicts a storage system including a read channel circuit with an enhanced synchronization detection circuit in accordance with some embodiments of the present invention.

Turning to FIG. 1, a storage system 100 including a read channel circuit 110 with an enhanced synchronization detection circuit is shown in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. The desired track is identified in part using the enhanced servo data processing circuit. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. As part of decoding the received information, read channel circuit 110 performs synchronization data detection on the received data stream using an enhanced synchronization detection circuit. The enhanced synchronization detection circuit may be implemented similar to that described below in relation to FIG. 3, and/or may operate in accordance with the method discussed below in relation to FIG. 5. A write operation is substantially the opposite of the preceding read operation with write data 101 being provided to read channel circuit 110. This data is then encoded and written to disk platter 178.

It should be noted that storage system 100 may be integrated into a larger storage system such as, for example, a RAID (redundant array of inexpensive disks or redundant array of independent disks) based storage system. It should also be noted that various functions or blocks of storage system 100 may be implemented in either software or firmware, while other functions or blocks are implemented in hardware.

Figure 2:
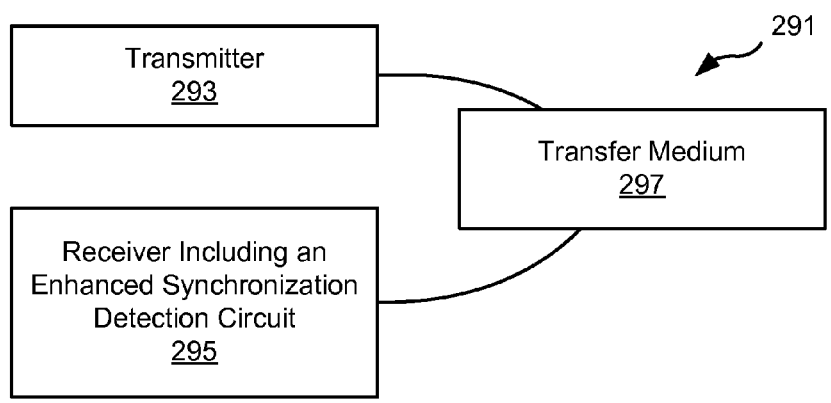
FIG. 2 depicts a data transmission system including a receiver with an enhanced synchronization detection circuit in accordance with some embodiments of the present invention.

Turning to FIG. 2, a data transmission system 291 including a receiver 295 including an enhanced synchronization detection circuit in accordance with various embodiments of the present invention. Data transmission system 200 includes a transmitter 293 that is operable to transmit encoded information via a transfer medium 297 as is known in the art. The transfer medium may be any transfer medium known in the art including, but not limited to, a wireless or wired transfer medium. The encoded data is received from transfer medium 297 by receiver 295. Receiver 295 incorporates the enhanced synchronization detection circuit. Such an enhanced synchronization detection circuit may be implemented similar to that described below in relation to FIG. 3, and/or may operate similar to the method discussed below in relation to FIG. 5.

Figure 3:
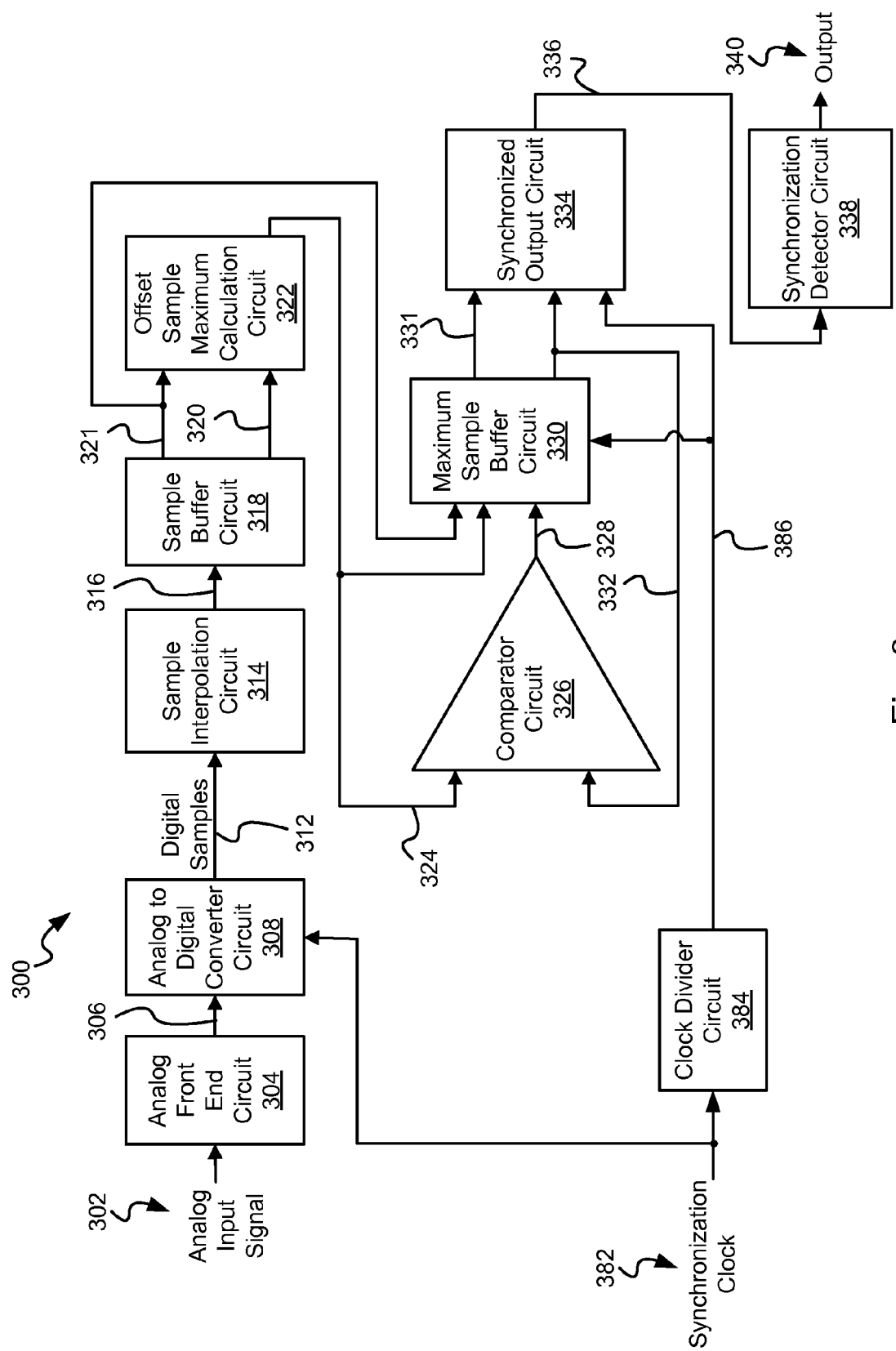
FIG. 3 shows a synchronization detection circuit in accordance with some embodiments of the present invention.

Turning to FIG. 3, a synchronization detection circuit 300 is shown in accordance with various embodiments of the present invention. Synchronization detection system 300 includes an analog front end circuit 304 that receives an analog input signal 302. Analog input signal 302 may be received from, for example, a storage medium or a transfer medium. Such a storage medium may be, for example, a magnetic storage disk. The transfer medium may be, for example, a wireless or wired transfer medium. Based upon the disclosure provided herein, one of ordinary skill in the art will recognize a variety of storage media, transfer media or other sources from which analog input signal 302 may be derived. Analog front end circuit 304 processes analog input signal 302 and provides a processed analog signal 306 to an analog to digital converter circuit 308. Analog front end circuit 304 may include, but is not limited to, an analog filter and an amplifier circuit as are known in the art. Based upon the disclosure provided herein, one of ordinary skill in the art will recognize a variety of circuitry that may be included as part of analog front end circuit 304.

Figure 4A:
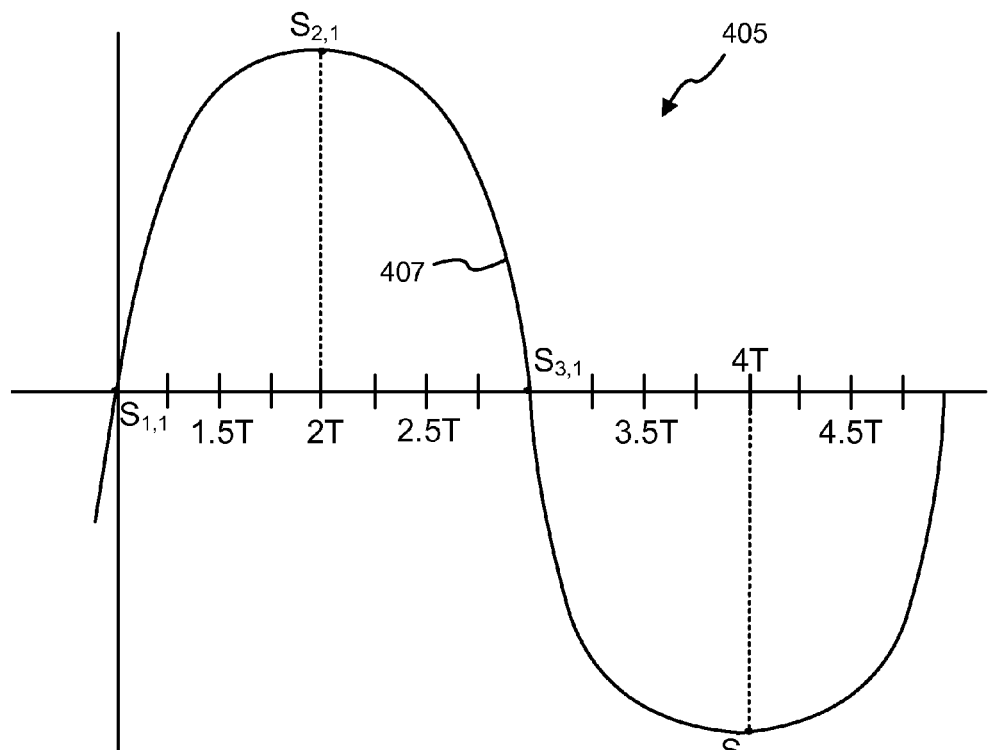
FIGS. 4a-4b graphically depict example non-interpolated samples and post interpolated samples occurring in relation to operation of the synchronization detection circuit of FIG. 3.

Analog to digital converter circuit 308 converts processed analog signal 306 into a corresponding series of digital samples 312 synchronous to a synchronization clock 382. Analog to digital converter circuit 308 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. FIG. 4a is a graph 405 showing a number of digital samples ($S_{1,1}$, $S_{2,1}$, $S_{3,1}$, $S_{4,1}$) that correspond to a continuous time signal 407. Such sample values are generated by analog to digital converter circuit 308 at respective T sample increments (e.g., 1T, 2T, 3T, 4T).

Digital samples 312 are provided to a sample interpolation circuit 314. Sample interpolation circuit 312 is operable to interpolate between adjacent samples to calculate or generate a number of sample values corresponding to respective sub-T sample increments (e.g., 1.25T, 1.5T, 1.75T, 2.25T, 2.5T, 2.75T, 3.25T, 3.5T, 3.75T, 4.25T, 4.5T, 4.75T). These interpolated samples are included with the originally sensed samples to yield a full set of digital samples a shown in FIG. 4b ($S'_{1,1}$, $S'_{1,2}$, $S'_{1,3}$, $S'_{1,4}$, $S'_{2,1}$, $S'_{2,2}$, $S'_{2,3}$, $S'_{2,4}$, $S'_{3,1}$, $S'_{3,2}$, $S'_{3,3}$, $S'_{3,4}$, $S'_{4,1}$, $S'_{4,2}$, $S'_{4,3}$, $S'_{4,4}$). Thus, in this example, the analog to digital converter circuit yields four samples per cycle that are interpolated to yield 16 total samples for the cycle.

Figure 4B:
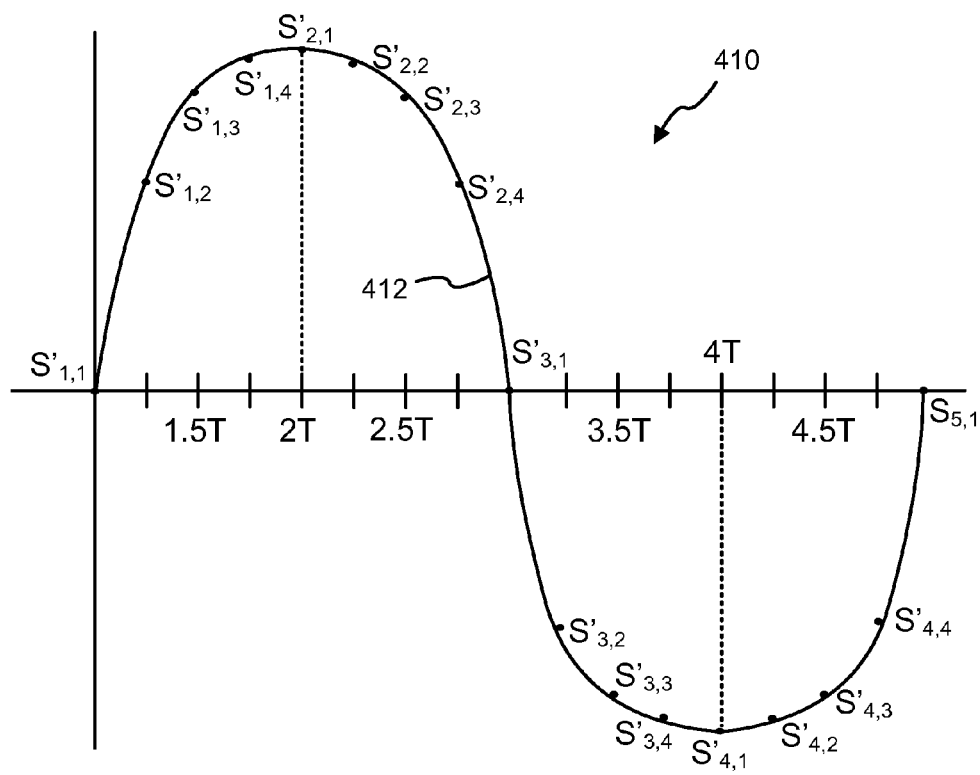

Interpolated sample outputs 316 are stored on a first in, first out basis to a sample buffer circuit 318. Sample buffer circuit 318 may be any memory device or system known in the art that is capable of storing a number of interpolated sample outputs 316 corresponding to at least one sample more than one half cycle of a period of the synchronization signal. The period of the synchronization signal corresponds to a bit period of each bit in the synchronization signal. In the case of FIG. 4b where the cycle is 4T, the half cycle is a 2T cycle. Based upon the disclosure provided herein, one of ordinary skill in the art will recognize a variety of memories that may be used in relation to different embodiments of the present invention. Further, based upon the disclosure provided herein, one of ordinary skill in the art will recognize a variety of periods of the synchronization pattern.

Two samples (a prior sample 320 and a later sample 321) from sample buffer circuit 318 are provided to an offset sample maximum calculation circuit 322. Later sample 321 is one half cycle of the period of the synchronization signal after prior sample 322. Referring to FIG. 4b, where sample $S'_{3,1}$ is later sample 321, sample $S'_{1,1}$ is prior sample 320; where sample $S'_{3,2}$ is later sample 321, sample $S'_{1,2}$ is prior sample 320; where sample $S'_{3,3}$ is later sample 321, sample $S'_{1,3}$ is prior sample 320; and where sample $S'_{4,4}$ is later sample 321, sample $S'_{2,4}$ is prior sample 320. Offset sample maximum calculation circuit 322 calculates an absolute value of a difference 324 between later sample 321 and prior sample 320 in accordance with the following equation:

Difference 324=Later Sample 321−Prior Sample 320.

Each instance i of difference 324 is provided to a comparator circuit 326 where the absolute value of the difference is compared with a prior maximum value 332 occurring across the current cycle. In addition, later sample 321 is provided to a maximum sample buffer circuit 330. For example, where the absolute value of the difference between $S'_{4,1}$ and $S'_{2,1}$ (i.e., abs[$S'_{4,1}$−$S'_{2,1}$]) is the maximum for the cycle, and $S'_{4,1}$−$S'_{2,1}$<0, then $S'_{2,1}$ is stored as the maximum sample. Alternatively, where the absolute value of the difference between $S'_{6,1}$ (not shown on FIG. 6b, but corresponding to a 2T offset from $S'_{4,1}$) and $S'_{4,1}$ (i.e., abs[$S'_{6,1}$−$S'_{4,1}$]) is the maximum for the cycle, and $S'_{6,1}$−$S'_{4,1}$>0, then $S'_{6,1}$ is stored as the maximum sample.

In operation, maximum sample buffer circuit 330 stores both later sample 321 and the corresponding instance of difference 324 whenever comparator circuit 326 asserts a comparison output 328 indicating that the current instance of difference 324 is greater than or equal to prior maximum value 332. In such a case, difference 324 becomes prior maximum value 332 stored in maximum sample buffer circuit 330 and the corresponding instance of later sample 321 is stored to maximum sample buffer circuit 330 as a current data output 331. This process of selecting a maximum difference for each cycle is represented by the following equation:

Maximum Difference 332=Maximum{abs[$S_{i,j}$−$S_{mod((i+2),4),j}$]}.

The instance i is a subset defined by the following:

$i \epsilon [1,n]$.

The aforementioned n represents the period of the synchronization signal (e.g., 4 for 4T, 8 for 8T, or the like). The instance j is a subset defined by the following:

$j \epsilon [1,m]$.

The aforementioned m represents the oversampling for the period.

Synchronization clock 382 is provided to a clock divider circuit 384 that asserts a divided output 386 once per cycle. Upon assertion of divided output 386 a synchronized output circuit 334 provides current data output 331 as an output 336. In addition, upon assertion of divided output 386, prior maximum value 332 is set equal to zero to assure it does not impact identification of the maximum difference for the next clock cycle. Output 336 is provided to a synchronization detector circuit 338 that compares a series of instances of output 336 against an expected synchronization pattern. Where a match is detected, synchronization detector circuit 338 asserts an output 340. Based upon the disclosure provided herein, one of ordinary skill in the art will recognize various synchronization circuits known in the art that may be used in relation to different embodiments of the present invention to implement synchronization detector circuit 338.

Using the example of FIG. 4b and assuming the cycle period begins between the sample $S'_{1,1}$ and the sample $S'_{1,2}$. In such a case, the value of sample $S'_{1,2}$ is subtracted from the value of sample $S'_{3,2}$ to yield a first instance of distance 324 (distance 324 [1]). Where distance 324 [1] is greater than that stored in maximum sample buffer circuit 330 (i.e., prior maximum value 332). In this case assuming it is greater, distance 324 [1] is stored to maximum sample buffer circuit 330 along with the corresponding sample $S'_{1,2}$. Next, the value of sample $S'_{1,3}$ is subtracted from the value of sample $S'_{3,3}$ to yield a second instance of distance 324 (distance 324 [2]). This second instance of distance 324 (i.e., distance 324 [2]) is compared against the first instance (i.e., distance 324 [1]). In the case depicted in FIG. 4b, the absolute value of distance 324 [2] is greater than the distance 324 [1]. As such distance 324 [2] is retained in maximum sample buffer circuit 330 along with the corresponding sample, $S'_{1,3}$. Next, the value of sample $S'_{1,4}$ is subtracted from the value of sample $S'_{3,4}$ to yield a third instance of distance 324 (distance 324 [3]). This third instance of distance 324 (i.e., distance 324 [3]) is compared against the second instance (i.e., distance 324 [2] maintained as prior maximum value 332). In the case depicted in FIG. 4b, the absolute value of distance 324 [3] is greater than the distance 324 [2]. As such distance 324 [3] is retained in maximum sample buffer circuit 330 along with the corresponding sample, $S'_{3,4}$. Next, the value of sample $S'_{2,1}$ is subtracted from the value of sample $S'_{4,1}$ to yield a fourth instance of distance 324 (distance 324 [4]). This fourth instance of distance 324 (i.e., distance 324 [4]) is compared against the third distance—distance 324 [3] maintained as prior maximum value 332). In the case depicted in FIG. 4b, the absolute value of distance 324 [4] is greater than the distance 324 [3]. As such distance 324 [4] is stored to maximum sample buffer circuit 330 as prior maximum sample 332 along with the corresponding sample, $S'_{2,1}$. Next, the value of sample $S'_{2,2}$ is subtracted from the value of sample $S'_{4,2}$ to yield a fifth instance of distance 324 (distance 324 [5]). This fifth instance of distance 324 (i.e., distance 324 [5]) is compared against the fourth distance—distance 324 [4] maintained as prior maximum value 332). In the case depicted in FIG. 4b, the absolute value of distance 324 [5] is less than the distance 324 [4]. As such distance 324 [4] is retained in sample buffer circuit 330 as prior maximum sample 332 along with the corresponding sample, $S'_{2,1}$. Next, the value of sample $S'_{2,3}$ is subtracted from the value of sample $S'_{4,3}$ to yield a sixth instance of distance 324 (distance 324 [6]). This sixth instance of distance 324 (i.e., distance 324 [6]) is compared against the fourth distance—distance 324 [4] maintained as prior maximum value 332). In the case depicted in FIG. 4b, the absolute value of distance 324 [6] is less than the distance 324 [4]. As such distance 324 [4] is retained in sample buffer circuit 330 as prior maximum sample 332 along with the corresponding sample, $S'_{2,1}$. Next, the value of sample $S'_{2,4}$ is subtracted from the value of sample $S'_{4,4}$ to yield a seventh instance of distance 324 (distance 324 [7]). This seventh instance of distance 324 (i.e., distance 324 [7]) is compared against the fourth distance—distance 324 [4] maintained as prior maximum value 332). In the case depicted in FIG. 4b, the absolute value of distance 324 [7] is less than the distance 324 [4]. As such distance 324 [4] is retained in sample buffer circuit 330 as prior maximum sample 332 along with the corresponding sample, $S'_{2,1}$. Next, the value of sample $S'_{3,1}$ is subtracted from the value of sample $S'_{5,1}$ to yield an eighth instance of distance 324 (distance 324 [8]). This seventh instance of distance 324 (i.e., distance 324 [8]) is compared against the fourth distance—distance 324 [4] maintained as prior maximum value 332). In the case depicted in FIG. 4b, the absolute value of distance 324 [8] is less than the distance 324 [4]. As such distance 324 [4] is retained in sample buffer circuit 330 as prior maximum sample 332 along with the corresponding sample, $S'_{2,1}$. At the end of processing a cycle of samples (in this case sixteen samples), the sample retained in maximum sample buffer circuit 330, $S_{2,1}$, is provided as output 336 which is used for synchronization detection. This process is then repeated for subsequent cycles.

Figure 5:
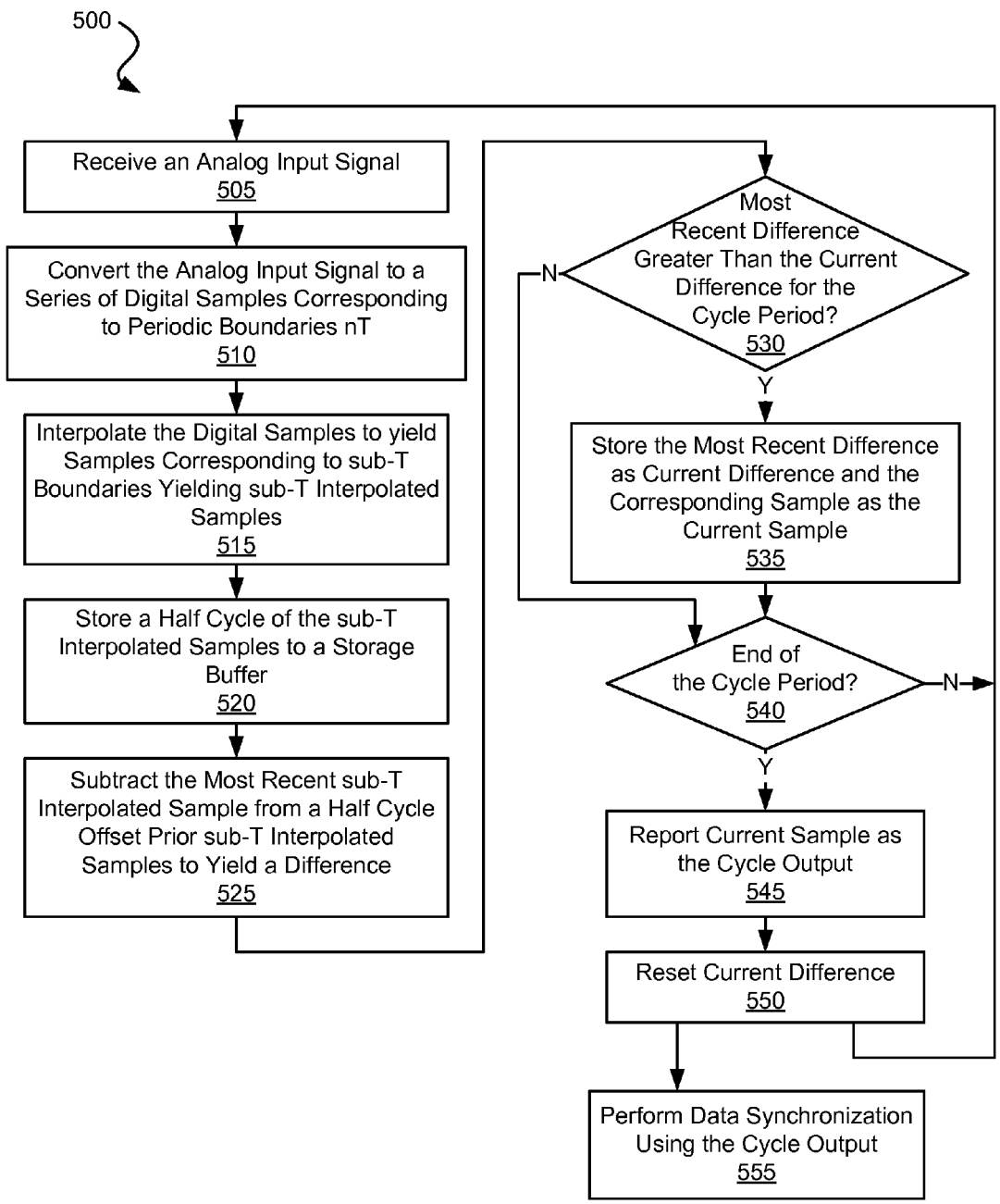
FIG. 5 is a flow diagram of a method in accordance with some embodiments of the present invention for synchronization detection.

Turning to FIG. 5, a flow diagram 500 shows a method in accordance with some embodiments of the present invention for synchronization detection. Following flow diagram 500, an analog input signal is received (block 505). The analog input signal may be derived from a storage medium via a read/write head assembly. Alternatively, the analog input signal may be derived from a transfer medium. Based upon the disclosure provided herein, one of ordinary skill in the art will recognize a variety of sources from which the analog input signal may be derived.

The received analog input signal is converted to a series of digital samples corresponding to periodic boundaries nT (block 510). For example, the analog input signal may correspond to a pattern exhibiting a 4T period that is sampled sixteen times over the 4T period (similar to that discussed in relation to FIG. 4b). It should be noted that the pattern may exhibit a different period, or a different oversampling. Based upon the disclosure provided herein, one of ordinary skill in the art will recognize a variety of periods for the pattern, and a variety of oversampling rates that may be used in relation to different embodiments of the present invention.

The digital samples are interpolated to generate a number of samples corresponding to sub-T boundaries yielding sub-T interpolated samples (block 515). The interpolation operates to estimate values between two digital samples. For example, digital samples such as those shown in FIG. 4a are adjusted to yield maximum sample points such as that shown in FIG. 4b. Based upon the disclosure provided herein, one of ordinary skill in the art will recognize a variety of approaches for interpolation that may be used in relation to one or more embodiments of the present invention. It should be noted that a larger oversampling may be used in place of or in addition to interpolation to yield samples corresponding to the maximums and minimums.

At least a half cycle (e.g., 2T samples where the pattern exhibits a 4T period) of the sub-T interpolated samples are stored to a storage buffer (block 520). The most recent sub-T interpolated sample is subtracted from a half cycle offset prior sub-T interpolated sample to yield a difference (block 525). Referring to FIG. 4b, as an example the value of sample $S_{1,3}$ is subtracted from the value of sample $S_{3,3}$ to yield a most recent instance of the distance (i.e., most recent difference). The most recent difference is compared with a maximum difference that was previously stored for the cycle (i.e., a current difference) (block 530). Where it is determined that the most recent difference is greater than the current difference (block 530), the most recent difference is stored as the current difference, and the corresponding sample as the current sample (block 535). Alternatively, where it is determined that the most recent difference is not greater than the current difference (block 530), the current difference and corresponding sample are retained.

It is then determined whether a cycle period has passed (block 540). Where a cycle period has not yet passed (block 540), the processes of blocks 505-535 are repeated for the next sample. Otherwise, where the cycle has passed (block 540), the current sample is provided as the output for the cycle (block 545), and the current difference is reset (block 550). Resetting the current difference may be done, for example, by overwriting the current difference value with a zero. Thus assures that a difference for the next cycle that is tested will be identified as a maximum. The cycle output is used to perform a pattern detection related to data synchronization (block 555). In addition, the processes of blocks 505-550 are repeated for the next cycle.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data synchronization. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for sample selection, the system comprising:
a difference calculation circuit operable to:
calculate a first difference between a first value corresponding to a first digital sample and a second value corresponding to a second digital sample,
calculate a second difference between a third value corresponding to a third digital sample and a fourth value corresponding to a fourth digital sample,
calculate a third difference between a fifth value corresponding to a fifth digital sample and a sixth value corresponding to a sixth digital sample, and
calculate a fourth difference between a seventh value corresponding to a seventh digital sample and an eighth value corresponding to an eighth digital sample;
a comparator circuit operable to:
compare the first difference with the second difference to yield a first comparison output,
compare the first difference with the third difference to yield a second comparison output, and
compare the first difference with the fourth difference to yield a third comparison output; and
an output selector circuit operable to select the second value as an output based at least upon a combination of the first comparison output, the second comparison output, and the third comparison output.

2. The system of claim 1, the system further comprising:
an analog to digital converter circuit operable to convert an analog input to a series of digital samples, wherein the analog input signal includes an information set exhibiting a bit period.

3. The system of claim 2, wherein the first digital sample, the second digital sample, the third digital sample, and the fourth digital sample correspond to the analog input signal during the same cycle of the bit period.

4. The system of claim 2, wherein the first digital sample and the third digital sample correspond to the analog input signal during a first half cycle of the bit period, and wherein the second digital sample and the fourth digital sample correspond to the analog input signal during a second half cycle of the bit period.

5. The system of claim 4, wherein the first half cycle immediately precedes the second half cycle.

6. The system of claim 1, wherein the digital samples include at least sixteen samples generated for each bit period, wherein the first value is the value of the first digital sample, wherein the second value is the value of the second digital sample, wherein the third value is the value of the third digital sample, and wherein the fourth value is the value of the fourth digital sample.

7. The system of claim 1, the system further comprising:
an interpolation circuit operable to interpolate the digital samples to align at least one of the first digital sample, the second digital sample, the third digital sample, and the fourth digital sample to a sub-T boundary yielding the first value, the second value, the third value, and the fourth value.

8. The system of claim 1, wherein the system is implemented as part of a device selected from a group consisting of: a storage device, and a data transmission device.

9. The system of claim 1, wherein the system is implemented as an integrated circuit.

10. The system of claim 1, wherein the system is implemented as part of a pattern detection system.

11. The system of claim 10, wherein the pattern detection system is a data synchronization system.

12. A method for detecting information in a data stream, the method comprising:
receiving an analog input signal, wherein the analog input signal includes an information set exhibiting a bit period;
converting the analog input signal to a series of digital samples, wherein at least a first digital sample, a second digital sample, a third digital sample, a fourth digital sample, a fifth digital sample, a sixth digital sample, a seventh digital sample, and an eighth digital sample are generated for each bit period;
calculating a first difference between first value derived from the first digital sample and a second value derived from the second digital sample;
calculating a second difference between a third value derived from the third digital sample and a fourth value derived from the fourth digital sample;
calculating a third difference between a fifth value derived from the fifth digital sample and a sixth value derived from the sixth digital sample;
calculating a fourth difference between a seventh value derived from the seventh digital sample and an eighth value derived from the eighth digital sample;
determining that the first difference is greater than or equal to each of the second difference, the third difference, and the fourth difference the second difference; and selecting the value of the second digital sample as an output sample based at least in part on the determination that the first difference is greater than or equal to each of the second difference, the third difference, and the fourth difference.

13. The method of claim 12, wherein the first digital sample and the third digital sample correspond to the analog input signal during a first half cycle of the bit period, and wherein the second digital sample and the fourth digital sample correspond to the analog input signal during a second half cycle of the bit period.

14. The method of claim 13, wherein the first half cycle immediately precedes the second half cycle.

15. The method of claim 12, wherein the bit period includes a plurality of T boundaries, the method further comprising:
   interpolating the digital samples to align at least one of the first digital sample, the second digital sample, the third digital sample, and the fourth digital sample to a sub-T boundary yielding the first value, the second value, the third value, and the fourth value.

16. The method of claim 12, wherein the digital samples include at least sixteen sampled generated for each bit period, wherein the first value is the value of the first digital sample, wherein the second value is the value of the second digital sample, wherein the third value is the value of the third digital sample, and wherein the fourth value is the value of the fourth digital sample.

17. The method of claim 12, wherein the first digital sample, the second digital sample, the third digital sample, and the fourth digital sample correspond to the analog input signal during the same cycle of the bit period.

18. A storage device, the storage device comprising:
   a storage medium operable to maintain an information set exhibiting a bit period;
   a read/write head assembly disposed in relation to the storage medium, wherein the read/write head is operable to sense the information set and provided to an analog input signal corresponding to the information set;
   an analog to digital converter circuit operable to convert the analog input to a series of at least a first digital sample, a second digital sample, a third digital sample, and a fourth digital sample;
   an interpolation circuit operable to interpolate the first digital sample, the second digital sample, the third digital sample, and the fourth digital sample to align at least one of the first digital sample, the second digital sample, the third digital sample, and the fourth digital sample to a sub-T boundary yielding a first value corresponding to the first digital sample, a second value corresponding to the second digital sample, a third value corresponding to the third digital sample, and a fourth value corresponding to the fourth digital sample;
   a difference calculation circuit operable to:
      calculate a first difference between a first value corresponding to a first digital sample and a second value corresponding to a second digital sample,
      calculate a second difference between a third value corresponding to a third digital sample and a fourth value corresponding to a fourth digital sample,
      calculate a third difference between a fifth value corresponding to a fifth digital sample and a sixth value corresponding to a sixth digital sample, and
      calculate a fourth difference between a seventh value corresponding to a seventh digital sample and an eighth value corresponding to an eighth digital sample;
   a comparator circuit operable to:
      compare the first difference with the second difference to yield a first comparison output,
      compare the first difference with the third difference to yield a second comparison output, and
      compare the first difference with the fourth difference to yield a third comparison output; and
   an output selector circuit operable to select the second value as an output based at least upon a combination of the first comparison output, the second comparison output, and the third comparison output.

19. The storage device of claim 18, wherein the digital samples include at least sixteen samples generated for each bit period, wherein the first value is the value of the first digital sample, wherein the second value is the value of the second digital sample, wherein the third value is the value of the third digital sample, and wherein the fourth value is the value of the fourth digital sample.

* * * * *